(12) United States Patent
Gambuzzi et al.

(10) Patent No.: US 11,248,593 B2
(45) Date of Patent: Feb. 15, 2022

(54) SWASH PLATE BEARING

(71) Applicant: DANA MOTION SYSTEMS ITALIA S.R.L., Reggio Emilia (IT)

(72) Inventors: David Gambuzzi, Castelnuovo Rangone (IT); Simone Annovi, Fiorano Modenese (IT); Paolo Comodi, Reggio Emilia (IT); Luca Fontanesi, Reggio Emilia (IT)

(73) Assignee: Dana Motion Systems Italia S.r.l., Reggio Emilia (IT)

( * ) Notice: Subject to any disclaimer, the term of this patent is extended or adjusted under 35 U.S.C. 154(b) by 0 days.

(21) Appl. No.: 16/969,597

(22) PCT Filed: Feb. 12, 2019

(86) PCT No.: PCT/EP2019/053440
§ 371 (c)(1),
(2) Date: Aug. 13, 2020

(87) PCT Pub. No.: WO2019/158528
PCT Pub. Date: Aug. 22, 2019

(65) Prior Publication Data
US 2021/0010464 A1 Jan. 14, 2021

(30) Foreign Application Priority Data
Feb. 14, 2018 (EP) ..................... 18425006

(51) Int. Cl.
*F16C 19/36* (2006.01)
*F16C 19/50* (2006.01)
(Continued)

(52) U.S. Cl.
CPC .......... *F04B 1/2085* (2013.01); *F01B 3/0073* (2013.01); *F04B 1/148* (2013.01);
(Continued)

(58) Field of Classification Search
CPC ...... F16C 19/361; F16C 19/46; F16C 19/463; F16C 19/466; F16C 19/502; F16C 19/513;
(Continued)

(56) References Cited

U.S. PATENT DOCUMENTS

| 5,383,391 A | 1/1995 | Goade |
| 5,390,584 A * | 2/1995 | Fritz .................... F01B 3/0073 91/505 |

(Continued)

FOREIGN PATENT DOCUMENTS

| DE | 202007009224 U1 * | 11/2008 | .............. F04B 1/148 |
| DE | 102007062008 | 6/2009 | |

(Continued)

OTHER PUBLICATIONS hole_www.merriam-webster.com (Year: 2021).*

*Primary Examiner* — Phillip A Johnson
(74) *Attorney, Agent, or Firm* — Marshall & Melhorn, LLC

(57) ABSTRACT

A swash plate bearing is disclosed. The swash plate bearing may have an arcuate cage member having at least one flange and a plurality of rolling elements rotatably coupled to the at least one flange. A coupling seat extends laterally from the at least one flange, the coupling seat may have an insertion hole. A link member may be rotatably coupled to the cage member, the link member having a central portion positioned between a first terminal portion and a second terminal portion. A first stem connects the central portion to the first terminal portion and a second stem connects the central portion to the second terminal portion. The central portion is positioned in the insertion hole.

20 Claims, 7 Drawing Sheets

(51) Int. Cl.
  *F16C 33/46* (2006.01)
  *F04B 1/2085* (2020.01)
  *F01B 3/00* (2006.01)
  *F04B 1/148* (2020.01)

(52) U.S. Cl.
  CPC .......... *F16C 19/361* (2013.01); *F16C 19/502* (2013.01); *F16C 33/467* (2013.01)

(58) Field of Classification Search
  CPC .. F16C 33/467; F16C 2360/42; F01B 3/0073; F04B 1/148; F04B 1/2085
  See application file for complete search history.

(56) References Cited

U.S. PATENT DOCUMENTS 5,590,579 A * 1/1997 Weber .................. F04B 1/2085
                                                                    417/269
5,630,352 A    5/1997 Todd

FOREIGN PATENT DOCUMENTS

| EP | 0771936        | 5/1997  |            |
|----|----------------|---------|------------|
| JP | 2001304098 A * | 10/2001 | F16C 19/502 |
| JP | 2001349288     | 12/2001 |            |
| JP | 2003214330     | 7/2003  |            |
| JP | 2003214330 A * | 7/2003  | F16C 33/306 |

* cited by examiner

SWASH PLATE BEARING

TECHNICAL FIELD

This disclosure relates to the field of variable displacement hydraulic piston devices; particularly to the field swashplate-type variable displacement hydraulic piston devices; and more particularly to swash plate bearings for swashplate-type variable displacement hydraulic piston devices.

BACKGROUND

Variable displacement hydraulic piston devices having a tiltable swash plate that controls the displacement or flow rate of the piston within a rotating cylinder block. An example of a tiltable swash plate is the cradle-type swash plate provided in a housing. An arcuate swash plate bearing are disposed between a convex arcuate surface on the swashplate and a concave seating surface in the housing.

The swash plate bearing enables the swash plate to tilt relative to the housing. The swash plate bearing may have a plurality of roller bearing segments that may be located in bearing shoes or cages. The roller bearing segments undergo not only rolling motions, but also sliding motions due to rapid tilting movements and the inertia of the swash plate bearing that may lead to slipping.

In order to assure that the swash plate bearings do not slip to an adverse position during operation a timing or a locating arrangement is positioned between the swashplate and the housing. The timing or a locating arrangement is pivotably connected to the swash plate bearing. The timing or a locating arrangement prevents slipping of the swash plate bearings.

U.S. Pat. No. 5,630,352 discloses a variable displacement hydraulic piston machine having saddle bearings that pivotally mount a yoke to a base within a housing. The yoke controls displacement of pistons in the cylinder block. Each saddle bearing includes arcuate inner and outer bearing races fixed to the yoke and the housing base respectively, a plurality of rolling elements captured by a cage between the races, and a timing lever positioning and retaining the races and the cage with respect to each other. The timing lever has a central portion pivotally mounted to the bearing between the bearing races, and opposed end portions pivotally received in the housing base and yoke.

EP0771936 discloses a variable displacement axial piston hydraulic unit having a cradle surface and a swashplate with a convex surface. A roller bearing assembly includes a bearing cage defining a slot. Bearing clocking is accomplished by a link member including several portions. A first portion is pivotally mounted relative to the housing. A second portion pivots and slides within an elongated slot defined by the swashplate. A clocking portion pivots and slides within the slot.

The present disclosure is directed, at least in part, to improving or overcoming one or more aspects of the prior art system.

BRIEF SUMMARY OF THE INVENTION

The present disclosure describes a swash plate bearing. The swash plate bearing comprises an arcuate cage member having at least one flange and a plurality of rolling elements rotatably coupled to the at least one flange. A coupling seat extends laterally from the at least on flange, the coupling seat having an insertion hole. A link member is rotatably coupled to the cage member, the link member having a central portion positioned between a first terminal portion and a second terminal portion. A first stem connects the central portion to the first terminal portion and a second stem connects the central portion to the second terminal portion. The central portion is positioned in the insertion hole.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a swash plate bearing for a variable displacement hydraulic device.

Figure 1:
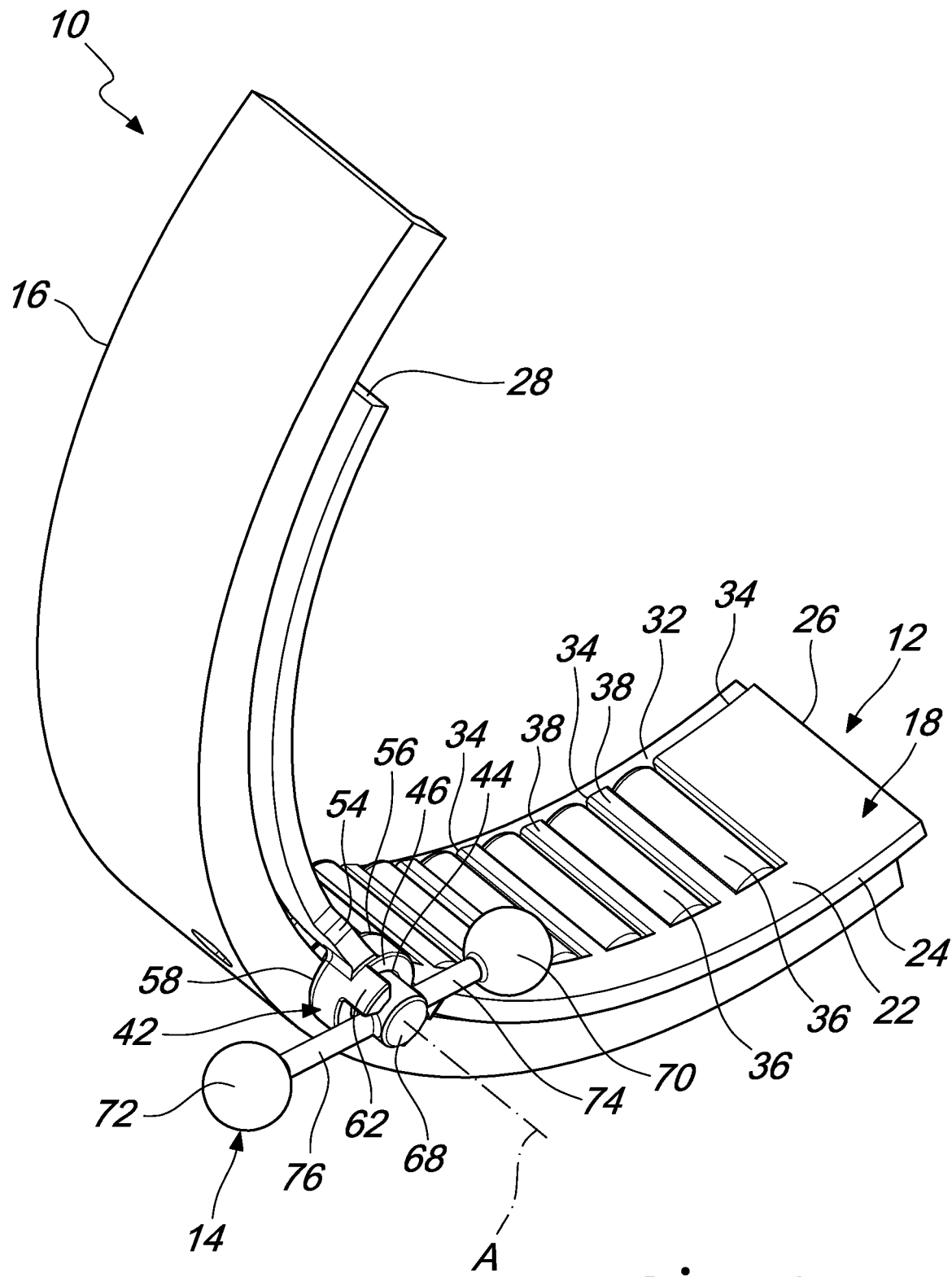
FIG. 1 is an isometric view of the swash plate bearing according to the present disclosure.
Figure 2:
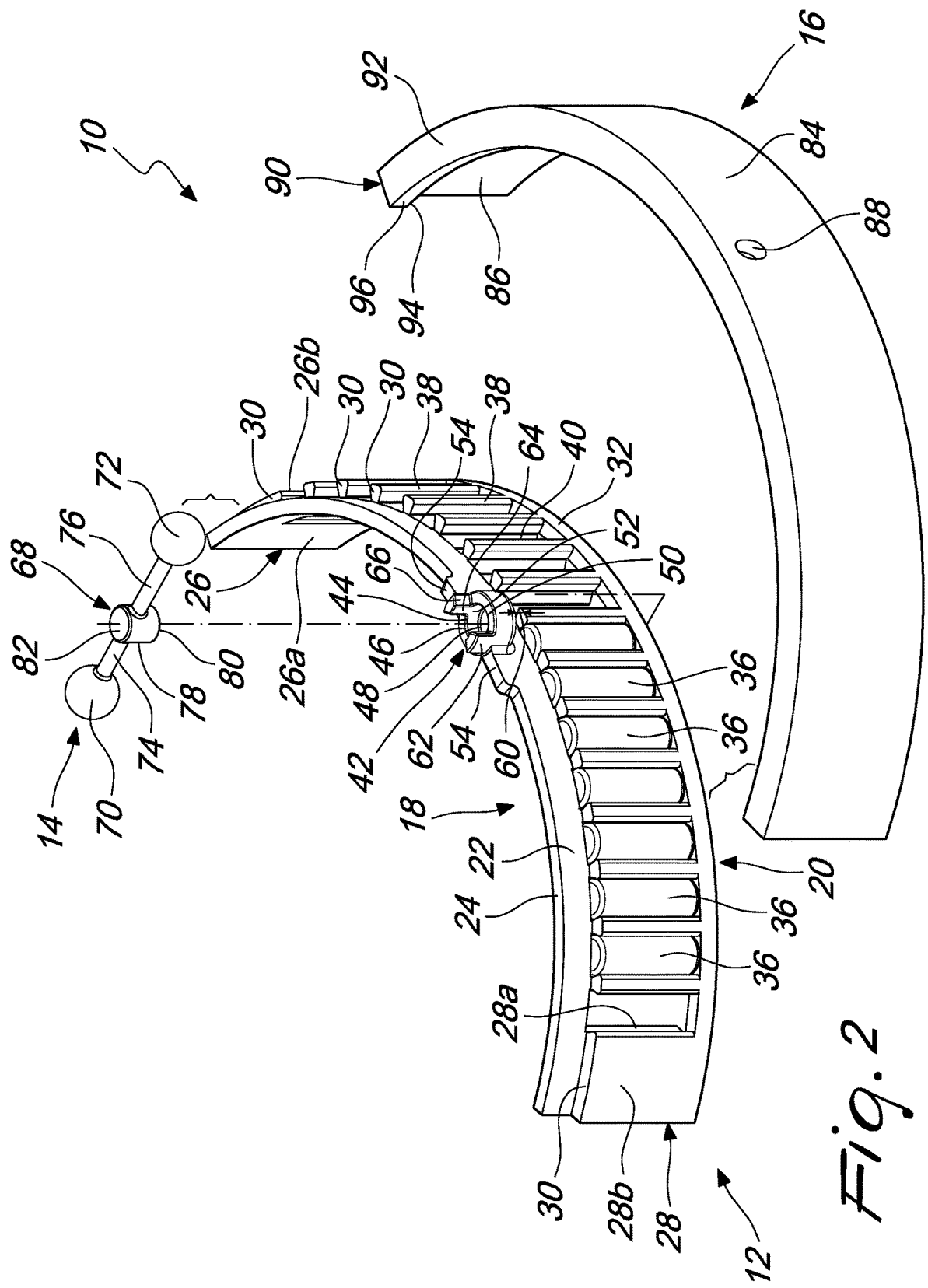
FIG. 2 is an exploded view of the swash plate bearing of FIG. 1.

FIGS. 1 and 2 illustrate a swash plate bearing 10. The swash plate bearing 10 comprises a cage member 12 and a link member 14. The cage member 12 has an arcuate shape. The cage member 12 has a cage concave face 18 and a cage convex face 20. The cage concave face 18 and the cage convex face 20 are formed on opposite sides of the cage member 12.

Cage member 12 comprises at least one flange 22. In an embodiment, cage member 12 may further comprise of a second flange 32. First flange 22 is arcuate shaped. First flange 22 has an edge 24 extending along the length thereof. In an embodiment, the cage concave face 18 and the cage convex face 20 may comprise opposite surfaces of the first flange 22. The cage concave face 18 and the cage convex face 20 may be formed on opposite sides of the first flange 22.

Second flange 32 is arcuate shaped. Second flange 32 is parallel to the first flange 22. Second flange 32 is spaced away from the first flange 22. In an embodiment, the cage concave face 18 and the cage convex face 20 may comprise opposite surfaces of the second flange 32. The cage concave face 18 and the cage convex face 20 may be formed on opposite sides of the second flange 32.

Cage member 12 may further comprise at least one tab 26, 28. The at least one tab 26, 28 is positioned at an end of the first flange 22. In an embodiment cage member 12 may comprise a first tab 26 and a second tab 28. Respectively, first and second tabs 26, 28 extend laterally from the first flange 22. Respectively, first and second tabs 26, 28 extend in a direction away from the edge 24. First and second tabs 26, 28 are positioned at opposite ends of the first flange 22.

In an embodiment, the cage concave face 18 and the cage convex face 20 may comprise the respective surfaces of the first and second tabs 26, 28. The cage concave face 18 and the cage convex face 20 may be formed on opposite sides of the first and second tabs 26, 28 respectively.

At the cage concave face 18, first and second tabs 26, 28 are level with first flange 22. With reference to FIG. 2, at the cage convex face 20, first and second tabs 26, 28 are not level with first flange 22. First flange 22 is offset relative to the first and second tabs 26, 28. Respective first shoulder portions 30 are formed between the first flange 22 and first and second tabs 26, 28 at the cage convex face 20. Respective first shoulder portions 30 are mutually level.

At least one tab 26, 28 connects the first and second flanges 22, 32. In an embodiment, both the first and second tabs 26, 28 connect the first and second flanges 22, 32. First and second tabs 26, 28 connect laterally to the second flange 32. First and second tabs 26, 28 are positioned at opposite ends of the second flange 32.

At the cage convex face 20, first and second tabs 26, 28 are level with second flange 32. With reference to FIG. 1, at the cage concave face 18, first and second tabs 26, 28 are not level with second flange 32. Second flange 32 is offset relative to the first and second tabs 26, 28. Respective second shoulder portions 34 are formed between the second flange 32 and first and second tabs 26, 28 at the cage concave face 18. Respective second shoulder portions 34 are mutually level.

In an embodiment, first and second tabs 26, 28 may be each formed as overlapping bodies. First tab 26 may comprise a first tab concave side body 26a and a first tab convex side body 26b. First tab concave side body 26a overlaps with first tab convex side body 26b. First tab concave side body 26a is connected to the first flange 22 and is not connected to the second flange 32. First tab concave side body 26a may be monolithically formed with the first flange 22. First tab convex side body 26b is connected to the second flange 32 and is not connected to the first flange 22. First tab convex side body 26b may be monolithically formed with the second flange 32.

Second tab 28 may comprise a second tab concave side body 28a and a second tab convex side body 28b. Second tab concave side body 28a overlaps with second tab convex side body 28b. Second tab concave side body 28a is connected to the first flange 22 and is not connected to the second flange 32. Second tab concave side body 28a may be monolithically formed with the first flange 22. Second tab convex side body 26b is connected to the second flange 32 and is not connected to the first flange 22. Second tab convex side body 28b may be monolithically formed with the second flange 32.

Cage member 12 further comprises a plurality of rolling elements 36. The plurality of rolling elements 36 are rotatably held in the cage member 12. The plurality of rolling elements 36 are rotatably coupled to the at least one flange 22.

In an embodiment, a plurality of arms 38 extend from the first flange 22. With reference to FIG. 2, the plurality of arms 38 are mutually spaced apart forming gaps 40 therebetween. The plurality of arms 38 are mutually parallel. The plurality of rolling elements 36 are rotatably coupled between the plurality of arms 38. The plurality of rolling elements 36 are interspersed between the plurality of arms 38. The plurality of rolling elements 36 are located in the gaps 40. Terminal arms 36 are positioned at either ends of the cage member 12 adjacent to the first or second tabs 26, 28. Terminal rolling elements 36 are positioned between a terminal arm 38 and the respective first and second tab 26, 28.

In an embodiment, the plurality of arms 38 are connected between the first flange 22 and the second flange 32. At the cage concave face 18, plurality of arms 38 are level with first flange 22. With reference to FIG. 2, at the cage convex face 20, plurality of arms 38 are not level with first flange 22. First flange 22 is offset relative to the plurality of arms 38. Respective first shoulder portions 30 are formed between the first flange 22 and the plurality of arms 38 at the cage convex face 20. Respective first shoulder portions 30 are mutually level. The first shoulder portions 30 formed on the plurality of arms 38 are level with the first shoulder portions 30 formed on the first and second tabs 26, 28. The first shoulder portions 30 of the plurality of arms 38 and the first and second tabs 26, 28 provide a first travel path for the swash plate bearing 10.

At the cage convex face 20, plurality of arms 38 are level with second flange 32. With reference to FIG. 1, at the cage concave face 18, plurality of arms 38 are not level with second flange 32. Second flange 32 is offset relative to the plurality of arms 38. Respective second shoulder portions 34 are formed between the second flange 32 and the plurality of arms 38 at the cage concave face 18. Respective second shoulder portions 34 are mutually level. The second shoulder portions 34 formed on the plurality of arms 38 are level with the second shoulder portions 34 formed on the first and second tabs 26, 28. The second shoulder portions 34 of the plurality of arms 38 and the first and second tabs 26, 28 provide a second travel path for the swash plate bearing 10. The swash plate bearing 10 is constrained to travel along the path indicated by the first and second travel path.

With reference to FIGS. 1 and 2, the cage member 12 further comprises a coupling seat 42. The coupling seat 42 extends laterally from the first flange 22. The coupling seat 42 is positioned at the centre of the first flange 22 relative to the arc length of the first flange 22. The coupling seat 42 has an aperture 44. The aperture 44 faces away the first flange 22. The plane of the aperture 44 is parallel to the edge 24. A rim 46 surrounds the aperture 44.

The coupling seat 42 has an insertion hole 48. The insertion hole 48 extends linearly from the aperture 42 into the coupling seat 42. The insertion hole 48 ends at a bottom 50 formed by the first flange 22. The insertion hole 48 is enclosed by a wall 52. Wall 52 extends between the bottom 50 and the rim 46.

In an embodiment, coupling seat 42 is sunk into the first flange 22. In an alternate embodiment, the coupling seat 42 is positioned on the edge 24 of the first flange 22. A plane through the cross section of the coupling seat 42 is perpendicular to the first and second tabs 26, 28. A plane through the cross section of the coupling seat 42 is perpendicular to the cage concave surface 18 and the cage convex surface 20.

With reference to FIGS. 1 and 2, a pair of protrusions 54 extend laterally from the first flange 22. The protrusions 54 extend from the edge 24. The protrusions 54 are provided on opposite sides of the coupling seat 42. Protrusions 54 are formed adjacent the coupling seat 42. Protrusions 54 provide structural support to the coupling seat 42 on the first flange 22. Protrusions 54 are fused to the coupling seat 42.

The coupling seat 42 is annular. The aperture 44 is centrally positioned in the coupling seat 42. Aperture 44 is circular. Rim 46 is formed as a ring encircling the aperture 44. The insertion hole 48 is centrally positioned in the coupling seat 42. Insertion hole 48 is circular in cross section.

The diameter of the coupling seat 42 is greater than the width of the first flange 22. The coupling seat 42 extends over the first flange 22. Opposite portions of the coupling seat 42 extend transversely over the first flange 22. The coupling seat 42 extends over the cage concave face 18 and the cage convex face 20. Coupling seat 42 has a first base portion 56 and a second base portion 58 overhanging over the cage concave face 18 and the cage convex face 20 respectively. First base portion 56 is perpendicular to cage concave face 18. Second base portion 58 is perpendicular to the cage convex face 20. At the cage convex face 20 the coupling seat 42 is spaced from the first shoulder portions 30 of the arms 38. Second base portion 58 is linearly spaced from adjacent arms 38. An insertion gap 60 is formed between the second base portion 58 and the adjacent arms 38.

With reference to FIGS. 1 and 2, the cage member 12 further comprises a pair of teeth 62 positioned on the coupling seat 42. The pair of teeth 62 axially extend from the rim 46 of the coupling seat 42. The teeth 62 are formed as an extension of the rim 46. The direction of extension of the teeth 62 is parallel to the central axis of the coupling seat 42. The direction of extension of the teeth 62 is perpendicular to the plane of the aperture 44.

The teeth 62 are mutually diametrically opposed on the rim 46. Teeth 62 are positioned on opposite sides of the rim 46. Teeth 62 are positioned across the aperture 44. In an embodiment, the teeth 62 are positioned offset to the first flange 22. The teeth 62 are positioned offset to the edge 24.

The teeth 62 have respective inner surfaces 64. Inner surfaces 64 are positioned at the edge of the aperture 44. Inner surfaces 64 are flush with the wall 52 of the insertion hole 48. Inner surfaces 64 have the same curvature as the wall 52. Inner surfaces 64 serve as an extension of the wall 52. The diameter of the insertion hole 48 is substantially equal to the distance between the opposite inner surfaces 64.

Each respective teeth 62 has a pair of sidewalls 66. The sidewalls 66 flank the inner surfaces 64. The opposite sidewalls 66 of respective teeth 66 are aligned with the rim 46. The respective surfaces of the sidewalls 66 are continuous with the surface of the rim 46 on opposite sides of the respective teeth 62. The width of the sidewalls 66 are substantially equal to the width of the rim 46.

With reference to FIGS. 1 and 2, the link member 14 is rotatably coupled to the cage member 12. The link member 14 has a central portion 68 positioned between a first terminal portion 70 and a second terminal portion 72. In an embodiment, central portion 68 has a central axis A. Link member 14 is rotatable about the central axis A relative to the cage member 12. The central portion 68 is spaced from the first terminal portion 70 and from the second terminal portion 72. The central portion 68, the first terminal portion 70 and the second terminal portion 72 are linearly aligned.

A first stem 74 connects the central portion 68 to the first terminal portion 70. The first terminal portion 70 is connected to an end of the first stem 74. The opposite end of first stem 74 is connected to the central portion 68. A second stem 76 connects the central portion 68 to the second terminal portion 72. The second terminal portion 72 is connected to an end of the second stem 76. The opposite end of second stem 76 is connected to the central portion 68. In end embodiment, the connections of the first and second stems 74, 76 are located on opposite sides of the central portion 68.

The central portion 68 is inserted in the insertion hole 48. The central portion 68 is rotatably accommodated in the insertion hole 48. Central portion 68 is positioned between the teeth 62. The central portion 68 is rotatably accommodated between the teeth 62.

The central portion 68 is configured as a cylinder having a cylindrical surface 78, a first cylinder end 80 and a second cylinder end 82. The cylindrical surface 78 is circular in cross section and has a uniform diameter along the length thereof. The first cylinder end 80 and the second cylinder end 82 are mutually parallel.

The first and second stems 74, 76 are connected to the central portion 68 at the cylindrical surface 78. The first and second stems 74, 76 are extend transversely from central portion 68. First and second stems 74, 76 are perpendicular to the central axis A of the central portion 68. First and second stems 74, 76 are mutually linearly aligned. The first and second stems 74, 76 are spaced away from the first cylinder end 80. In an embodiment, first and second stems 74, 76 are positioned adjacent to the second cylinder end 82. The length of the first stem 74 is shorter relative to the second stem 76. The first terminal end 70 is configured as a sphere and the second terminal end 72 is configured as a sphere.

The link member 14 is supported by the coupling seat 42 and by the teeth 62. Portions of the cylindrical surface 78 slidably contacts with the wall 52 of the insertion hole 48 and with the inner surfaces 64 of the respective teeth 62. The first cylinder end 68 slidably contacts the bottom 50 of the insertion hole 48.

The first and second stems 74, 76 are spaced from the coupling seat 42. The first and second stems 74, 76 are spaced from the rim 46. The first and second stems 74, 76 are positioned at a vertical distance relative to the rim 46 so as to be contactable with the teeth 62. The first and second stems 74, 76 may abut the respective teeth 74, 76 when the link member 14 undergoes a rotation in the coupling seat 42. The rotational movement of the link member 14 is restricted by the abutting contact of the first and second stems 74, 76 and the respective teeth 74, 76. In an embodiment, the link member 14 is able to undergo a rotational movement of up to 180 degrees when positioned in the coupling seat 42.

Figure 3:
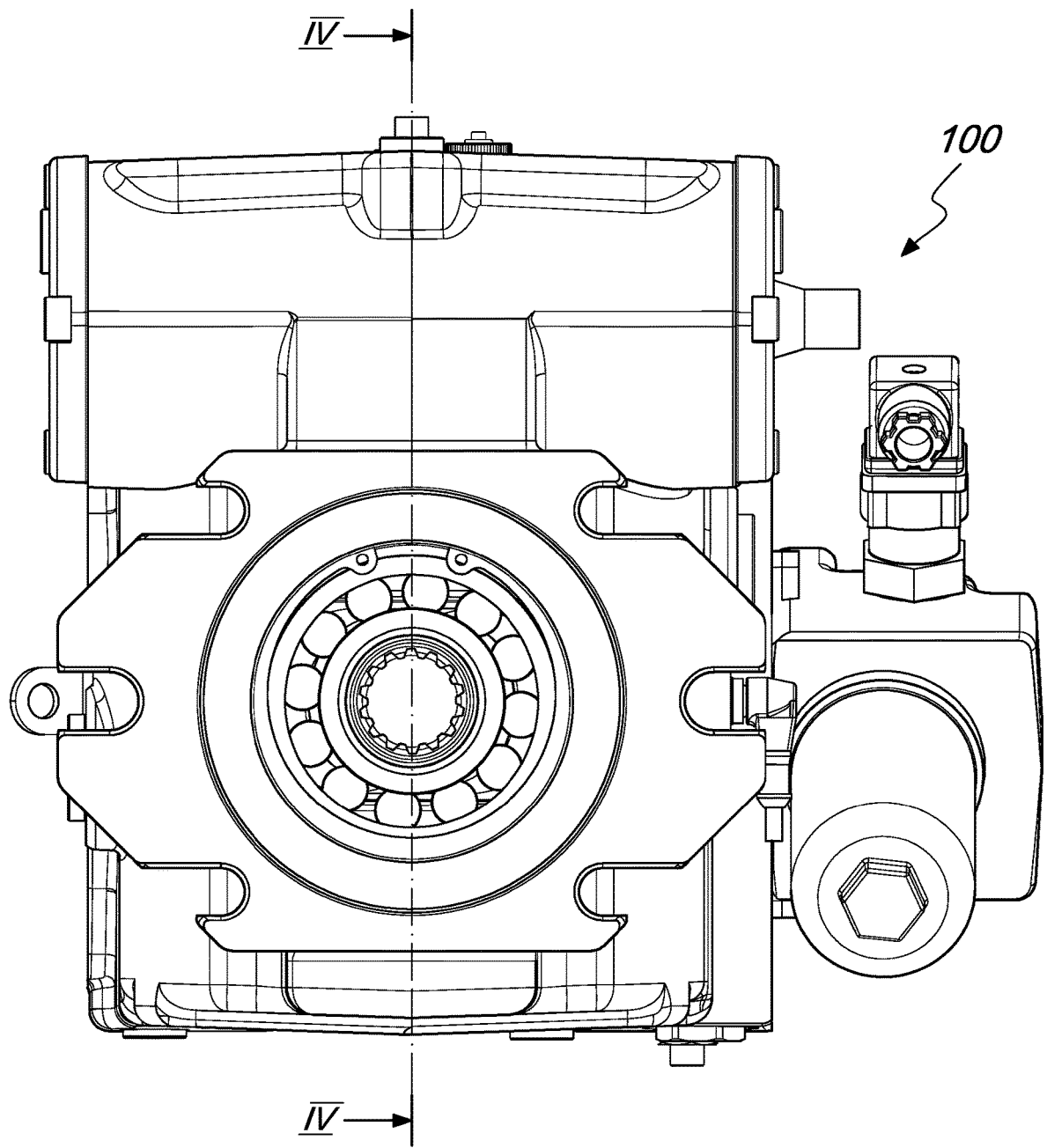
FIG. 3 is a front view of a variable displacement hydraulic device.

FIG. 3 illustrates a front view of a variable displacement hydraulic device 100. In an embodiment, the variable displacement hydraulic device 100 comprises at least one swash plate bearing 10. In an alternate embodiment, the variable displacement hydraulic device 100 comprises first and second swash plate bearings 10.

Figure 4:
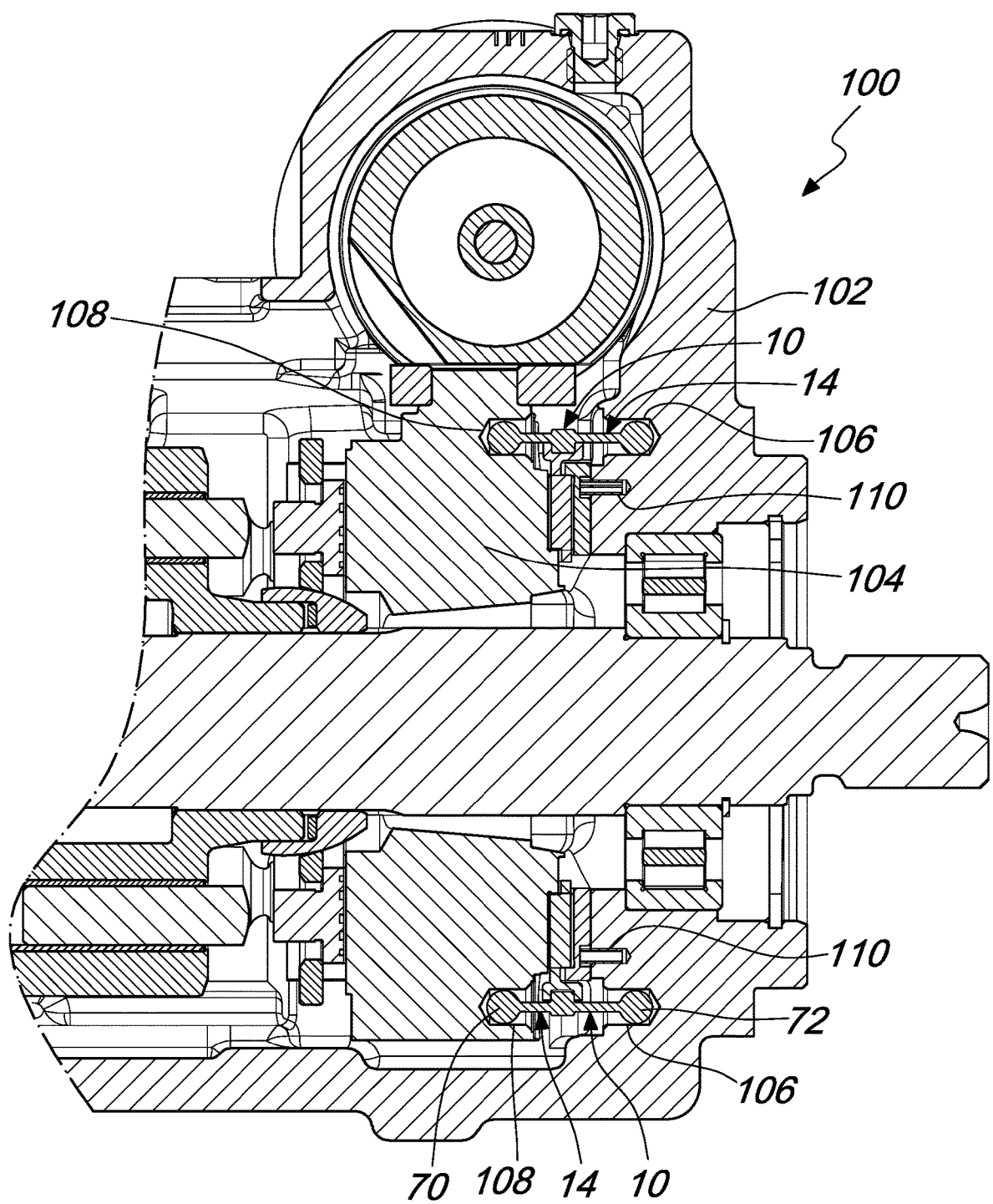
FIG. 4 is a cross sectional view of the variable displacement hydraulic device of FIG. 3 through line IV-IV.

FIG. 4 shows a cross section of the variable displacement hydraulic device 100 through the line IV-IV. The variable displacement hydraulic device 100 having a housing 102 and a swash plate 104. In an embodiment, the swash plate 104 is a cradle type swash plate. The swash plate bearings 10 are positioned between the swash plate 104 and the housing 102. The swash plate bearings 10 are located at opposite ends of the swash plate 104. Bolts 110 connect a bearing race member 16 to the housing 106. The bearing race member 16 is fixed relative to the housing 106.

The link member 14 is coupled to the swash plate 104 and the housing 102. The swash plate 104 has a bore 108 to accommodate the first terminal portion 70. First terminal portion 70 is slidably held in the bore 108. The housing 102 has a bore 106 to accommodate the second terminal portion 72. Second terminal portion 72 is slidably held in the bore 106. The terminal points of the path of the swash plate bearing 10 relative to the housing 102 and the swash plate 104 is restricted by the coupling of the link member 14 to the swash plate 104 and the housing 102.

Figure 5:
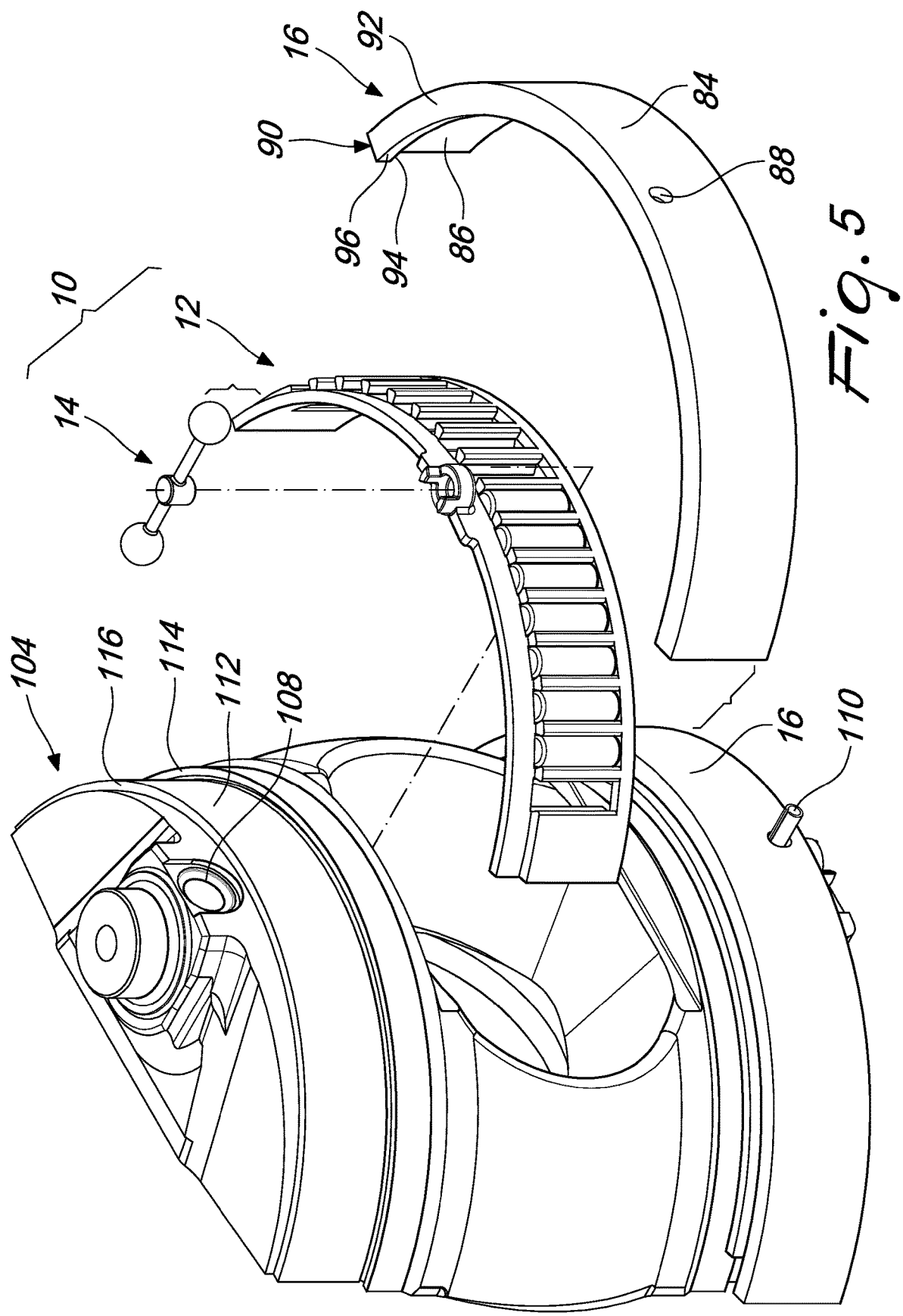
FIG. 5 is an exploded view of a swash plate, the swash plate bearing and a bearing race member of the variable displacement hydraulic device of FIG. 3.

FIG. 5 illustrates the swash plate bearing 10 coupled between the bearing race member 16 and the swash plate 104. The cage member 12 may be movably coupled to the bearing race member 16. The bearing race member 16 is arcuate shaped. The bearing race member 16 has a race convex surface 84, race concave surface 86 and a race ledge 90. Race convex surface 84 and the race concave surface 86 are formed on opposite sides of the bearing race member 16. A hole 88 is provided in the race convex surface 84 for accommodating the bolt 110.

Race ledge 90 is positioned along the corresponding sides of race convex surface 84 and the race concave surface 86. Race ledge 90 extends over the race concave surface 86. Race concave surface 86 accommodates the cage convex face 20 of the cage member 12. Race ledge 90 has a first race travel surface 92, a second race travel surface 92 and a race edge 96. First race travel surface 92 and second race travel surface 92 are on opposite sides of the race ledge 90. Race edge 96 connects the corresponding sides of the first race travel surface 92 and the second race travel surface 92.

The race ledge 90 fits into the insertion gap 60 between the second base portion 58 of the coupling seat 42 and the adjacent arms 38. In an embodiment, the second base portion 58 is not in contact with the first race travel surface 92 and the first shoulder portions 30 are not in contact with the second race travel surface 92. The race ledge 90 travels in the first travel path defined by the first shoulder portions 30 of the plurality of arms 38 and the first and second tabs 26, 28. The plurality of rolling elements 36 are rotatable against the race concave surface 86. The swash plate bearing 10 is movable relative to the bearing race member 16 as the rolling elements 36 rotate against the race concave surface 86.

Swash plate 104 has a bearing surface 112. Bearing surface 112 is convex and is accommodated in the cage concave face 18 of the cage member 12. A first swash ledge 114 extends from the bearing surface 112. The first swash ledge 114 is arcuate and is spaced from the bore 108. The first swash ledge 114 travels in the second travel path defined by the second shoulder portions 32 of the plurality of arms 38 and the first and second tabs 26, 28. In an embodiment, the first swash ledge 114 contacts the first shoulder portions 30. The first shoulder portions 30 moves along the first swash ledge 114 as the swash plate bearing 10 moves relative to the swash plate 104. A second swash ledge 116 extends from the bearing surface 112. The second swash ledge 116 is arcuate and is positioned adjacent the bore 108. In an embodiment, the first base portion 56 is not in contact with the second swash ledge 116. The plurality of rolling elements 36 are rotatable against the bearing surface 112. The swash plate bearing 10 is movable relative to the swash plate 104 as the rolling elements 36 rotate against the bearing surface 112.

Figure 6:
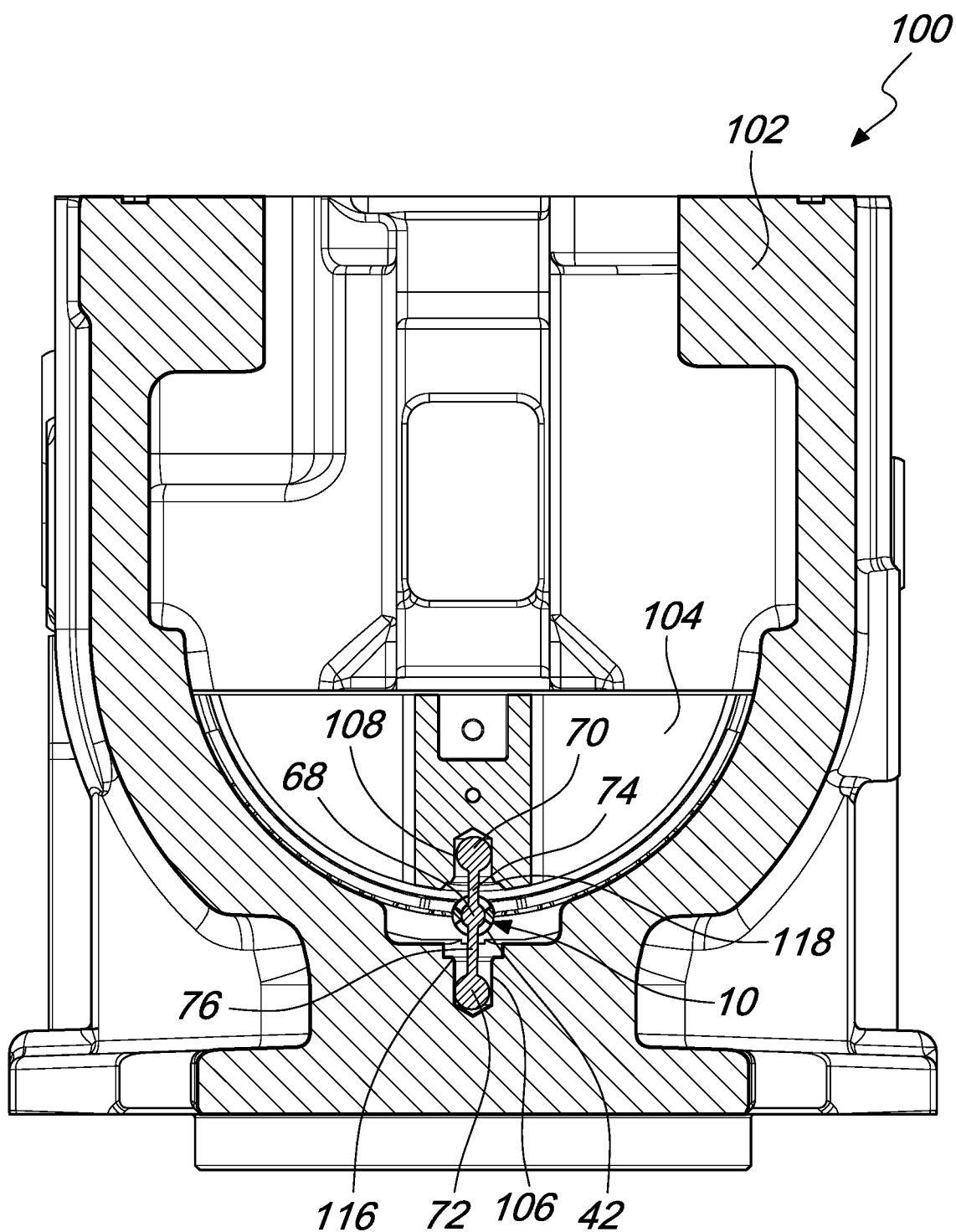
FIG. 6 is a sectional view through a partially assembled variable displacement hydraulic device showing the swash plate in a neutral position.

FIG. 6 illustrates a section through the swash plate bearing 10 positioned between the swash plate 104 and the housing 102 with the swash plate bearing 10 at neutral position and the swash plate 104 is at zero angular displacement. The central portion 68 of the link member 14 is positioned in the coupling seat 42 of the cage member 12. The bore 106 in the housing 102 and the bore 108 in the swash plate 104 are aligned. The first terminal portion 70 of the link member 14 is positioned at the end of the bore 108. The second terminal portion 72 of the link member 14 is positioned at the end of the bore 106.

Figure 7:
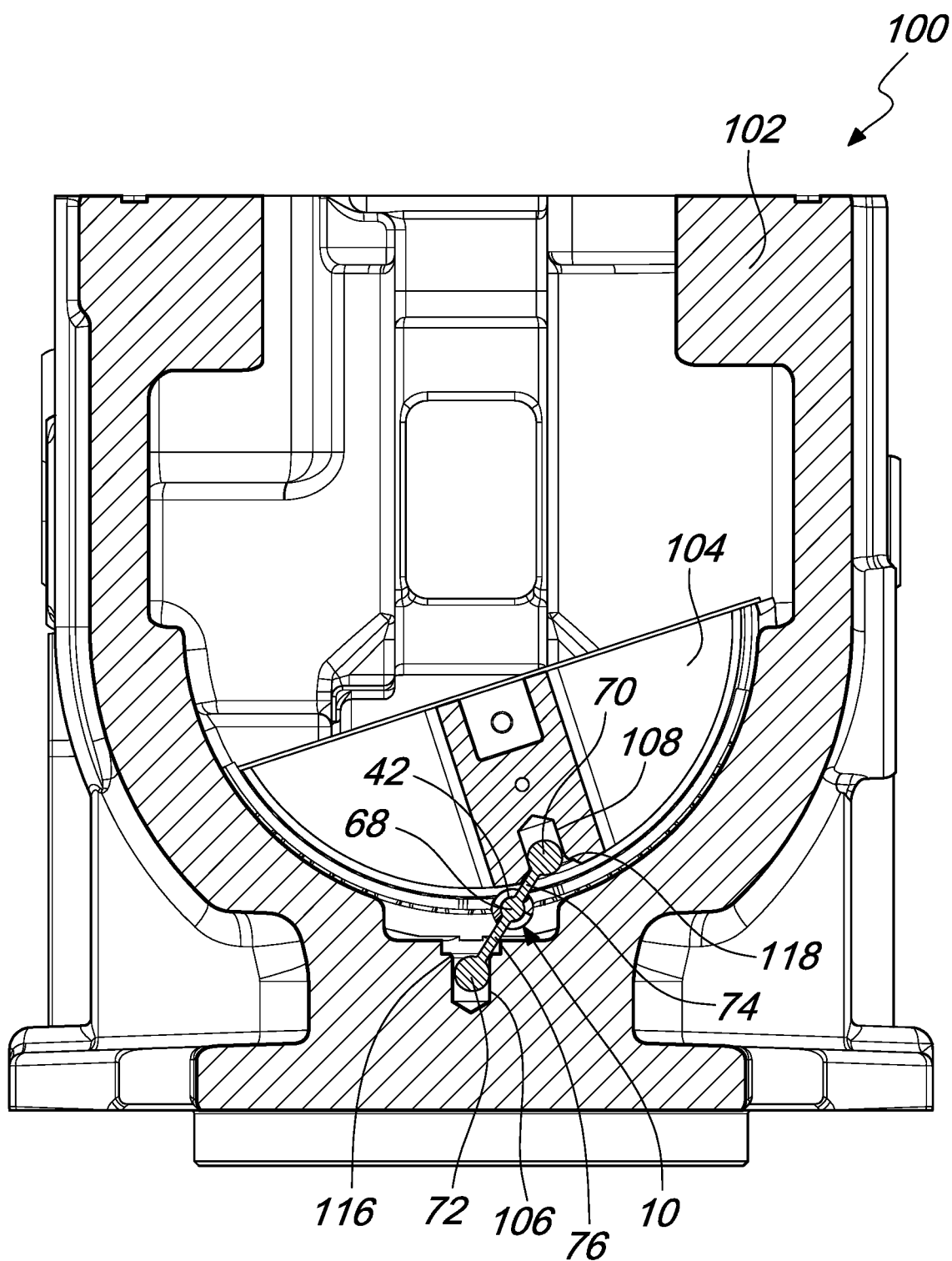
FIG. 7 is a sectional view through a partially assembled variable displacement hydraulic device showing the swash plate tilted to a maximum angle.

FIG. 7 illustrates a section through the swash plate bearing 10 positioned between the swash plate 104 and the housing 102 with the swash plate bearing 10 at a terminal position and the swash plate 104 is at a maximum angular displacement. The bore 106 in the housing 102 and the bore 108 in the swash plate 104 are spaced apart. The edges of the aperture 116 of the bore 106 is in contact with the first stem 74. The edges of the aperture 118 of the bore 108 is in contact with the second stem 76. The respective abutting contacts restricts further movement of the swash plate bearing 10. First and second terminal portions 70, 72 slide in the respective bores 108, 106 as the swash plate moves from a zero angular displacement to a maximum angular displacement. First and second terminal portions 70, 72 are positioned at the respective apertures 118, 116 of the bore 108 and the bore 106. The skilled person would appreciate that foregoing embodiments may be modified or combined to obtain the swash plate bearing 10 of the present disclosure.

INDUSTRIAL APPLICABILITY

This disclosure describes a swash plate bearing 10. The swash plate bearing 10 is comprised in a variable displacement hydraulic device 100. Swash plate bearing 10 couples the swash plate 104 and the housing 12 of the variable displacement hydraulic device 100. Swash plate bearing 10 enables relative movement between the swash plate 104 and the housing 102 while preventing slippage between the swash plate 104 and the housing 102.

Link member 14 is coupled to the cage member 12 so as to follow the movement of the cage member 12 through a pivoting movement. The link member 14 is coupled to the cage member 12 without additional components. The teeth 62 formed on the coupling seat 42 of the cage member 12 extends the contact between the link member 14 and the cage member 12 so as to provide a greater stability to the mutual coupling. The teeth 62 further limits extent of rotation of the link member 14 so that the general positions of the first and second terminal portions 70, 72 are maintained relative to the cage member 12.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The disclosures in European Patent Application No. 18425006.6 from which this application claims priority are incorporated herein by reference.

What is claimed is:

1. A swash plate bearing comprising:
   an arcuate cage member having at least one flange and a plurality of rolling elements rotatably coupled to the at least one flange, wherein a coupling seat extends laterally from the at least one flange, the coupling seat having an insertion hole;
   a link member rotatably coupled to the cage member, the link member having a central portion positioned between a first terminal portion and a second terminal portion, wherein a first stem connects the central portion to the first terminal portion and a second stem connects the central portion to the second terminal portion, and wherein the central portion is positioned in the insertion hole; and
   a pair of teeth axially extending from a rim of the coupling seat, wherein the teeth are mutually diametrically opposed on the rim and offset from the at least one flange.

2. The swash plate bearing of claim 1, wherein the coupling seat is annular and the insertion hole is centrally positioned.

3. The swash plate bearing of claim 1, wherein a diameter of the coupling seat is greater than a width of the at least one flange.

4. The swash plate bearing of claim 1, wherein opposite base portions of the coupling seat extend transversely over the at least one flange.

5. The swash plate bearing of claim 1, wherein the insertion hole extends from the aperture and wherein the inner surfaces of the teeth are flush with a wall of the insertion hole.

6. The swash plate bearing of claim 1, wherein the central portion is configured as a cylinder having a first cylinder end and a second cylinder end.

7. The swash plate bearing of claim 6, wherein the first and second stems are spaced away from the first cylinder end.

8. The swash plate bearing of claim 1, wherein a length of the first stem is shorter relative to the second stem.

9. The swash plate bearing of claim 1, wherein the first terminal portion is configured as a sphere and the second terminal portion is configured as a sphere.

10. The swash plate bearing of claim 1, further comprising a second flange, wherein at least one tab connects the second flange to the at least one flange, wherein a plurality of arms extends laterally between the at least one flange and the second flange, and wherein the rolling elements are interspersed between the plurality of arms.

11. A variable displacement hydraulic device comprising at least one swash plate bearing of claim 1, wherein the first terminal portion is coupled to a swash plate and the second terminal portion is coupled to a housing.

12. The variable displacement hydraulic device of claim 11, further comprising a bearing race member, the cage member being movably coupled to the bearing race member.

13. A swash plate bearing comprising:
    an arcuate cage member having at least one flange and a plurality of rolling elements rotatably coupled to the at least one flange, wherein a coupling seat extends laterally from the at least one flange, the coupling seat having an insertion hole; and
    a link member rotatably coupled to the cage member, the link member having a central portion positioned between a first terminal portion and a second terminal portion, wherein a first stem connects the central portion to the first terminal portion and a second stem connects the central portion to the second terminal portion, wherein the central portion is positioned in the insertion hole, wherein the central portion is configured as a cylinder having a first cylinder end and a second cylinder end, and wherein the first and second stems are spaced away from the first cylinder end.

14. The swash plate bearing of claim 13, wherein the coupling seat is annular and the insertion hole is centrally positioned.

15. The swash plate bearing of claim 13, wherein a diameter of the coupling seat is greater than a width of the at least one flange.

16. The swash plate bearing of claim 13, wherein opposite base portions of the coupling seat extend transversely over the at least one flange.

17. The swash plate bearing of claim 13, further comprising a pair of teeth axially extending from a rim of the coupling seat.

18. The swash plate bearing of claim 13, wherein a length of the first stem is shorter relative to the second stem.

19. The swash plate bearing of claim 13, wherein the first terminal portion is configured as a sphere and the second terminal portion is configured as a sphere.

20. The swash plate bearing of claim 13, further comprising a second flange wherein at least one tab connects the second flange to the at least one flange, wherein a plurality of arms extends laterally between the at least one flange and the second flange and wherein the rolling elements are interspersed between the plurality of arms.

* * * * *